US 6,543,387 B1

(12) United States Patent
Stein

(10) Patent No.: US 6,543,387 B1
(45) Date of Patent: Apr. 8, 2003

(54) SHIPPING CONTAINER FOR RODENTS

(75) Inventor: Jules L. Stein, Woodridge, IL (US)

(73) Assignee: Miro Mold Tools Corp., Yorkville, IL (US)

( * ) Notice: Subject to any disclaimer, the term of this patent is extended or adjusted under 35 U.S.C. 154(b) by 0 days.

(21) Appl. No.: 10/045,838

(22) Filed: Jan. 15, 2002

(51) Int. Cl.⁷ .............................................. A01K 1/03
(52) U.S. Cl. ...................................... 119/419; 119/496
(58) Field of Search ................................ 119/417, 418, 119/419, 496; 55/385.4, 501, 511

(56) References Cited

U.S. PATENT DOCUMENTS

| 1,619,895 A | * | 3/1927 | Tarman | 119/496 |
|---|---|---|---|---|
| 2,530,170 A | * | 11/1950 | Miller | 119/453 |
| 3,524,431 A | * | 8/1970 | Graham | 119/496 |
| 3,695,233 A | * | 10/1972 | Kovarik | 119/496 |
| 4,130,088 A | * | 12/1978 | Salvia | 119/475 |
| 4,561,587 A | * | 12/1985 | Wysocki | 55/501 |
| 4,732,675 A | * | 3/1988 | Badolato et al. | 55/501 |
| 4,737,174 A | * | 4/1988 | Pontius | 55/501 |
| 4,846,109 A | * | 7/1989 | Baer et al. | 119/496 |
| 4,869,206 A | * | 9/1989 | Spina | 119/417 |
| 4,928,630 A | * | 5/1990 | Kupersmit | 119/496 |
| 4,976,219 A | * | 12/1990 | Goguen et al. | 119/496 |
| 5,174,241 A | * | 12/1992 | Goguen et al. | 119/496 |
| 5,370,079 A | * | 12/1994 | Smith | 119/496 |
| 5,572,953 A | * | 11/1996 | Phelan et al. | 119/496 |
| 5,690,713 A | * | 11/1997 | Bowerman et al. | 55/501 |
| 5,935,282 A | * | 8/1999 | Lin | 55/501 |
| 5,979,364 A | * | 11/1999 | Ricketts | 119/496 |
| 6,041,741 A | * | 3/2000 | Gabriel et al. | 119/417 |
| 6,158,387 A | * | 12/2000 | Gabriel et al. | 119/419 |
| 6,227,146 B1 | * | 5/2001 | Gabriel et al. | 119/419 |
| 6,257,171 B1 | * | 7/2001 | Rivard | 119/419 |
| 6,295,950 B1 | * | 10/2001 | Deitrich et al. | 119/419 |
| 6,354,246 B1 | * | 3/2002 | Kamihata et al. | 119/496 |
| 6,361,578 B1 | * | 3/2002 | Rubinson | 55/501 |

FOREIGN PATENT DOCUMENTS

DE         002404058 A1 *  8/1975 ................. 119/496

* cited by examiner

Primary Examiner—Peter M. Poon
Assistant Examiner—Joan M. Olszewski
(74) Attorney, Agent, or Firm—John L. Schmitt

(57) ABSTRACT

A shipping container for rodents includes a boxlike base defined by a bottom connecting with outwardly sloped side and end walls. In openings in these walls are filter units that entrap contaminants. An interior space of the base is dividable into compartments by longitudinal and a lateral partition that includes a feeding bin. A lid of the container includes an outer edge channel that snaps over a top edge flange of the base walls to form an airtight fit. The lid has raised end portions formed with pairs of openings for further filter units. For use, the base is selectively divided into compartments by the partitions. When filled with rodents and the lid installed, sets of containers may be vertically stacked. As stacked and then closely packed, the filter units of each container remain free for cross-circulation of fresh, filtered air.

11 Claims, 3 Drawing Sheets

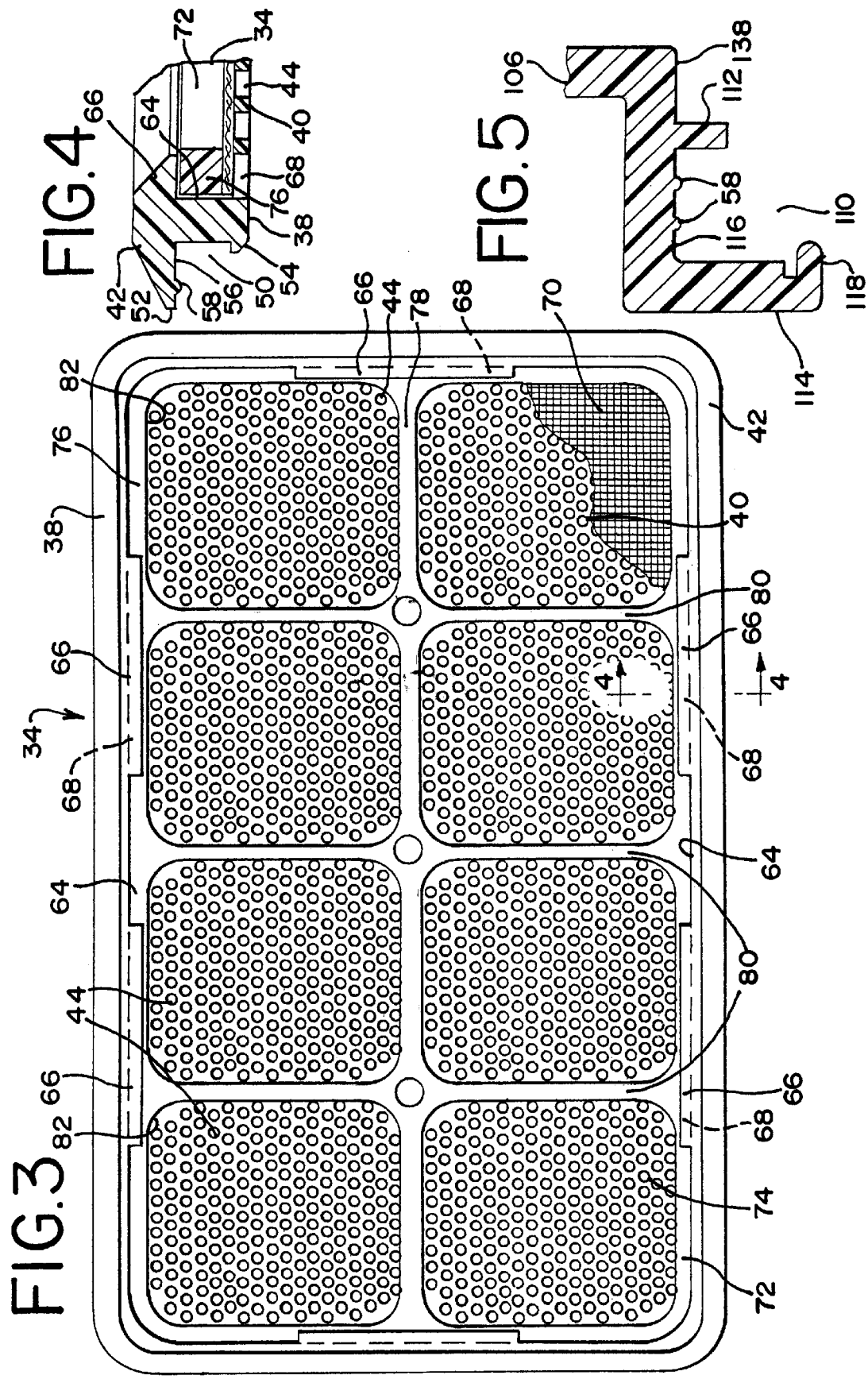

SHIPPING CONTAINER FOR RODENTS

BACKGROUND OF THE INVENTION

1. Field of the Invention

This invention relates generally to shipping containers and more particularly a container adapted for shipping medically useful rodents in an environment that insures maximum animal survival and facilitates animal loading and removal.

2. Prior Art

Containers particularly adapted for shipping small animals such as young poultry chicks, mice, or rats have been known and in use for many years.

One early example of this type of container is disclosed in U.S. Pat. No. 1,236,918. This container is a paper board receptacle that includes an open top box divided into compartments by interior partitions. The open top of the box is closed by a cover having a down-turned outer edge that fits tightly about a top peripheral edge of side and end walls of the box. In a top wall of the cover are four triangular-shaped vent opening sets. These opening sets may be selectively covered by a damper plate pivotally carried on the cover below a middle cross member. The cross member is located between spaced apart end members fastened next to respective ends of the cover. Fitted to the end and cross members is a set of three spaced apart longitudinal strips. Ends of the longitudinal strips and end members extend beyond the cover sides and ends.

During use, the outward extending ends of the cover end members and cross members prevent close-packing of a receptacle with adjacent shipping containers. Additionally, these members provide a space for air to circulate to the cover openings.

A further shipping container for laboratory animals is set out in U.S. Pat. No. 4,976,219. This container comprises a bottom plastic tray enclosed by a permanently attached dome-shaped perforated cover. An opening in a middle of a top wall of the cover provides access to an interior of the container. A retaining seal is permanently pressed into the cover opening to hold a removable wire mesh retainer and a transparent cover permanently attached to the retainer. Protrusions on the tray enhance stacking by maintaining registry between the cover of a lower container with the bottom tray of an above container.

A still further container for transporting laboratory animals is disclosed in U.S. Pat. No. 5,370,079. This container includes a base preferably made from wax-coated material. Sidewalls and end walls of the base slant upward and inward from a bottom to connect with an upper, outward projecting peripheral flange. The base walls are formed with vent openings lined with an air permeable material and then covered with wire mesh. The base is enclosed by a lid divided into first and second end portions by a fold line. Foldable edge tabs on the first lid portion are affixed to aligned portions of the base top flange by adhesive, for example. The tabs of the second lid portion and remaining base top flange portions then are joined by a single thread chain stitch. To open the container, an unstitched end of the thread is pulled to release the lid second portion. During transit, the slanted sides of the base insure that air flows to the vent openings.

A more recent animal tote is set out in U.S. Pat. No. 5,572,953. This tote comprises a bottom container portion having outwardly sloped sidewalls and end walls. In the sidewalls are recessed areas formed with respective sets of minute holes. Upper ends of the container walls connect with a top horizontal peripheral flange. This container flange fits into a channel formed by a spaced apart, inner and outer downwardly facing flanges formed about a periphery of a lid of the tote. A set of snaps in the lid outer flange secures the lid to the container. In each corner of the lid top member is a post having a flanged receiving area to hold a respective bottom corner of an above stacked tote container portion. These posts maintain a set of stacked totes in a spaced apart relationship allowing air to circulate to the lid holes. Lastly, like the container sidewalls, the lip top member has a set of recessed areas of minute holes. In each case, filter frames fit in the recess areas where side edges of the frames are held in place by shoulders on sides of the recesses.

SUMMARY OF THE INVENTION

A container of this invention is particularly adapted for shipping rodents or other like animals used in medical experiments, for example. This container includes a boxlike shaped base defined by a bottom wall and connecting outwardly sloped side and end walls formed with openings. Upper ends of the base walls connect with a peripheral edge flange. Sealed in each base opening is a removable filter unit. Each filter unit comprises a support member having a raised edge fitting about a perforated backing plate. The raised edge is formed with an outward facing channel that fits over an edge of the opening. Covering an outer side of the unit backing plate is a piece of filter cloth. This cloth piece then is held in place by a retainer having an open structure surrounded by a peripheral edge segment that fits under a set of spaced apart tabs on an inside of the support member raised edge. These tabs align with slots in the support member backing plate and facilitate placement of and removal of the retainer edge segment from under these tabs.

An interior space of the container base may be divided into two large compartments by a lateral partition having outer edges securable between ribs on an inner side of each base sidewall. This partition includes a feeding bin accessible from each compartment. These two large compartments then are further dividable into small compartments by longitudinal partitions.

The container base is enclosed by a lid. A middle cross piece of the lid has end down-turned edge channels with snaps that fit over respective opposing sections of the base sidewall edge flange. Integrally hinged to each side of the lid middle cross piece is an outer section having respective edge channels with like snaps to engage adjacent sections of the base edge flange. With all lid snaps engaged, the lid forms an airtight fit with the base. In a middle of each lid outer section is a raised portion defined by upwardly sloped end walls having pairs of openings for further filter units. Upper ends of these sloped end walls connect with a top horizontal segment having posts located on respective sides of a set of integrally formed transparent windows.

For use, the interior space of the base is selectively divided into compartments by the partitions for ready placement of rodents. As each large compartment of the container is filled, the outer section of the lid for that compartment is closed. When loading is complete, a set of containers may be vertically stacked by placing inverted, cup-shaped openings in a base bottom wall of an above container over the lid posts of a below container. As stacked and then closely packed, the filter units of each container remain free for in-and-out movement of fresh, filtered air.

The container of this invention provides several advantages over containers now known or presently in use.

A first advantage is that movement of air into and from the container is restricted to that which flows through the filter cloth of each filter unit. Note that the lid and base are joined by a releasable, but airtight connection. Additionally, each filter unit backing plate raised edge forms an airtight fit with its respective opening in the lid and base. Thus, rodents in a container remain isolated from ambient bacteria or viruses outside the container, and any like airborne contaminants. remain in the container.

Secondly, the positioning of the base filter units and the lid filter units insure cross-ventilation of the container. In particular, the eight filter units in the container lid provide more than adequate surface area for venting heat generated by the encased animals. Further, were a particular side of the base or portion of the lid inadvertently covered, there is a sufficient number of other filter units to insure that filtered air circulates to the encased animals.

Another important advantage is that the container may be readily sterilized after each shipment. Sterilization is critical to inhibit a possibility of cross-contamination from one shipment. to the next. Since the base, lid and filter unit support members and retainer are made of a rigid; high temperature thermosetting plastic, e.g., polypropylene, interior surfaces may be subjected to scouring at sterilizing temperatures. This required clearing is facilitated by ready disassembly of the lid from the base, the filter units from the container, and removal of the lateral partition from the base. Additionally, the filter unit retainer can be readily separated from its respective support member to provide access to the filter cloth. Were a container to be damaged requiring the container to be scrapped, the container is made recyclable material.

Finally, excluding the interior partitions and pieces of filter cloth, this container comprises just four individual moldable components. Interior partitioning adds two additional components. Requiring only six individual parts minimizes tooling costs while piece costs remain competitive.

DESCRIPTION OF THE DRAWING FIGURES

FIG. 3 is plan view of a filter unit for the container of FIG. 1 showing a backing plate of the unit and a partial view of a piece of filter cloth and retainer to hold the cloth in place.

FIG. 4 is a cross sectional view as seen generally alone the line 4—4 in FIG. 3.

FIG. 5 is a cross sectional view as seen generally alone the line 5—5 in FIG. 2.

DESCRIPTION OF THE PREFERRED EMBODIMENT

Figure 1:
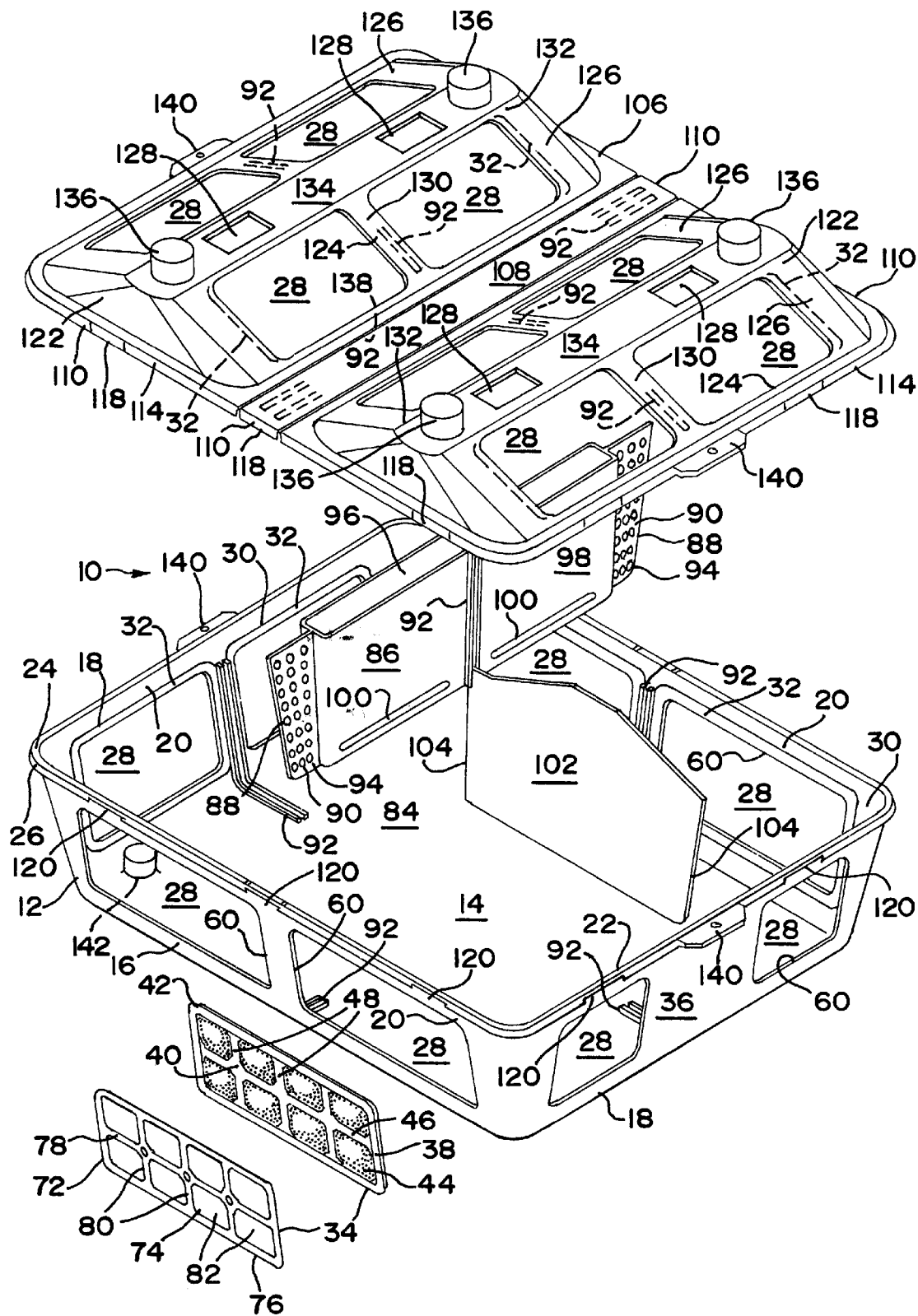
FIG. 1 is a perspective view of a container of this invention showing a lid, a base, a filter unit and interior partitions in a disassembled state.
Figure 2:
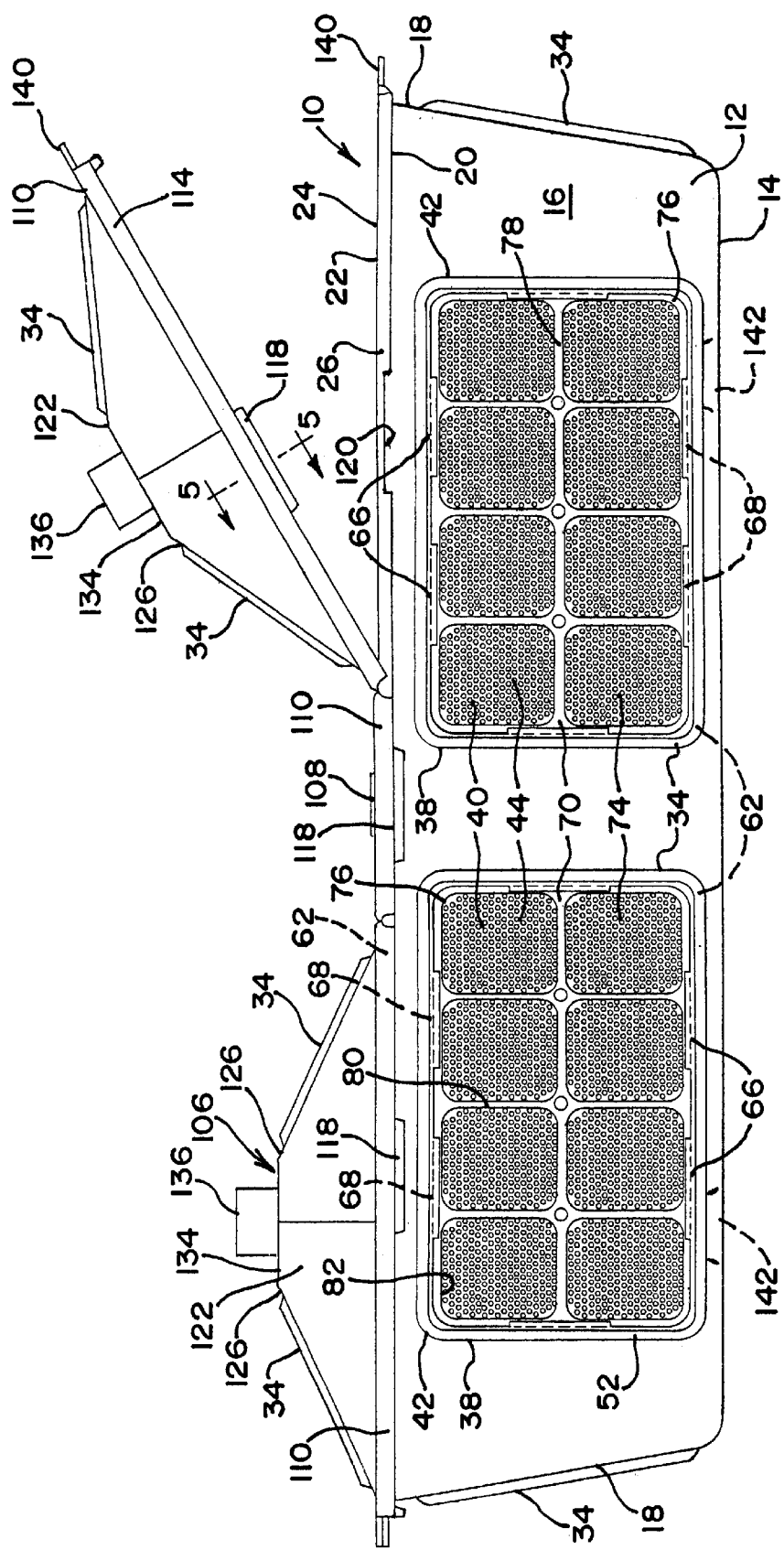
FIG. 2 is a side elevation view of the container of FIG. 1.

A container of this invention, particularly adapted for shipping rodents used in medical experimentation for example, is shown generally in FIG. 1 and designated 10. The container 10, preferably made of molded polypropylene, comprises a base 12 having a bottom wall 14 and connecting, outwardly sloped sidewalls 16 and end walls 18. Upper ends 20 of the base sidewall 16 and end walls 18 then connect with a peripheral edge flange 22 defined by a flat horizontal leg 24 and a connecting outer vertical leg 26. In each sidewall 16 and end wall 18 is a pair of openings 28. About each opening 28 on an inner side 30 of the base sidewall and end wall openings 28 is a recess 32.

Releasably located in each base opening 28 is a filter unit 34. The openings 28 and filter units 34 in one base end wall 18 are smaller to provide a segment 36 in-between for a shipping label (not shown). Regardless of size, the structure of the filter units 34 is alike; therefore, only one unit 34 will be described. Each unit 34, made of a semi-rigid plastic material preferably polypropylene, includes a support member 38 defined by a backing plate 40 surrounded by a raised edge 42, see FIG. 3. The backing plate 40 includes sets of perforations 44 spaced apart by a central longitudinal rib 46 and spaced apart lateral ribs 48. These ribs 46, 48 provide backing plate rigidity. The backing plate raised edge 42 includes an outward facing channel 50 defined by an outer flange 52 and an inner rib 54. On an inside face 56 of the channel outer flange 52 is a pointed sealing bead 58. This raised edge channel 50 fits over an edge 60 of the opening 28 to form an airtight fit 62. Spaced about an inside 64 of the backing plate raised edge 42 is a set of holding tabs 66. Aligned with these holding tabs 66 are slots 68 in the backing plate 40.

Each filter unit 34 further includes a piece of filter cloth 70 placed over the perforations 44 in the support member backing plate 40. The filter cloth 70 is coated with an antiseptic-like material to kill bacteria on contact and contain other airborne contaminants, for example.

The filter unit 34 lastly includes a retainer 72. This retainer 72 has an open structure 74 defined by a perimeter edge segment 76 that connects with a central cross rib 78 and spaced apart lateral ribs 80. These ribs 78, 80 define a set of openings 82 that align with the sets of perforations 44 in the support member backing plate 40. The perimeter edge segment 76 of the retainer 72 fits under the holding tabs 66 of the support member 38 to hold the filter cloth 70 flat against the backing plate 40. Note that the filter unit 34 can be made as an integral molded unit to be disposable. In this case the retainer 72 is molded onto the support member 38 after placing the filter cloth 70 on the backing plate 40. The slots 68 in the backing plate 40 and tabs 66 on the raised edge 42 then are eliminated. After each shipment these disposable units 34 simply are removed and discarded.

An interior space 84 of the base 12 typically is divided into two large compartments by a lateral partition 86, see FIG. 1. Outer edges 88 of end portions 90 of this partition 86 slidably fit between respective pairs of ribs 92 on the inner side 30 of each base sidewall 16. These ribs 92 extend onto the base bottom wall 14. Each end portion 90 has perforations 94 to allow air to circulate between the compartments. Between the partition end portions 90 is a feeding bin 96. On each sidewall 98 of the partition bin 96 is a further pair of ribs 92 located between a pair of bottom slots 100 in each bin sidewall 98. Each large compartment can be further divided into two small compartments by longitudinal partitions 102. Respective ends 104 of these longitudinal partitions 102 fit in a further pair of ribs 92 formed on the inner side 30 of the base bottom and end walls 14, 18 and in the lateral partition ribs 92.

The container 10 lastly includes a lid 106 having a middle cross piece 108. On each end of the cross piece 108 is a downward facing edge channel 110. Each edge channel 110 comprises an inner rib 112 and an outer flange 114. On a top wall 116 of the channel 110 is a pair of pointed sealing beads 58. On a lower end of the outer flange 114 is an inward projecting offset snap 118, see FIG. 5. These snaps 118 fit into notches 120 formed in the vertical leg 26 of each base sidewall peripheral edge flange 22 to hold the lid cross piece 108 in place. Integrally hinged on each side of the cross piece 108 is an outer section 122. Each outer section 122 has a like edge channel 110 that includes further offset snaps 118. These snaps 118 are spaced apart to engage further notches 120 in the base side and end wall edge flange vertical leg 26.

Each lid outer section 122 is formed with a raised portion 124 defined in part by spaced apart upwardly sloped end walls 126. Each end wall 126 has a pair of recessed openings 28 for additional filter units 34. These opening pairs 28 are spaced apart by respective central sections 130. Upper ends 132 of the raised portion end walls 126 connect with a top horizontal segment 134. On each end of each top segment 134 is a guide post 136. Additionally, each top segment 134 has transparent inserts forming windows 128 for interior inspection.

For use, the container base 12 is selectively divided into compartments as required for animals separation during transit. In most all cases, the container base 12 will be fitted with a lateral partition 86 so that the container 10 includes a feeding bin 96. To hold food, typically in a jell-like form, the bin slots 100 are covered with tape. When sufficiently hungry, the animals in a container 10 can easily chew through the tape to access to food in the bin 96.

Next, the lid 106 is placed on the base 12 with the lid middle cross piece 108 secured to the base edge flange 22 by the lid cross piece edge channel snaps 118. As located, upper ends of the feed bin sidewalls 98 fit in spaced apart pairs of ribs 92 formed on a bottom side 138 of the cross piece 108. During shipment, displacement of the lateral partition 86 is inhibited by engagement of all four sides of the partition 86 by the rib sets 92. Because each lid outer section 122 is hinged to the middle cross piece 108, the large compartments may be selectively covered after animal loading of a particular large compartment is complete. When a large compartment is further divided into small compartments by a longitudinal partition 102 and these small compartments are loaded and covered by the lid 106, an upper end of each longitudinal partition 102 is secured by a pair of ribs 92 on the bottom side 138 of the lid raised portion center section 130. Again, dislocation of this longitudinal partition 102 during transit is inhibited by engagement of all four sides of this partition 102 by the rib sets 92.

Once loading is complete, the lid outer sections 122 are lowered and secured to the base edge flange 22 by the lid snaps 118 engaging the notches 120 in the base sidewall and end wall peripheral edge flange 22. As closed, the inner rib 104 and outer flange 114 of the downward facing edge channel 110 of the lid 106 fit tightly over the base peripheral edge flange 22. As fitted, the sealing beads 58 of the edge channel 110 form an airtight fit 62 with the horizontal leg 24 of the base edge flange 22. Note that the offset configuration of the snaps 118 produces a compressive force that holds the lid sealing beads 58 snugly against that base edge flange horizontal leg 24. To prevent intentional lid removal from a container 10 during transit, ends of the base and lid 106 have locking tabs 140 for placement of tamper-resistant locks.

Because of the airtight fits 62 between the filter units 34 and the base and lid opening 28 and between the base peripheral edge flange 22 and the lid edge channel 110, movement of air into and out of the interior space 84 of the container 10 is limited to movement through the filter units 34. Concurrently, because the container filter units 34 aligned, i.e., sidewall 16 with sidewall 16, end wall 18 with end wall 18, and the increased surface area of the filter units 34 provided by the lid raised portion sloped end walls 126, there is enhanced cross-ventilation insuring that the encased animals continuously receive fresh, filtered air.

During transit, these filter units 34 remain free from obstruction. Note that it is common to stack containers 10 where the guide posts 136 of a lower container lid 106 fit in cup-shaped openings 142 in an above container base 12. Stacks of such containers 10 then may be closely packed side-by-side or closely packed with other shipping cartons, for example. As stacked and then packed, the base peripheral edge flange 22 and lid edge channel 110 of each container 10 insure horizontal spacing between adjacent structure and the filter units 34. The top horizontal segments 134 of each container lid raised portion 124 then insure vertical spacing between the lid filter units 34 and any above container 10 or other structure.

Finally, when a container 10 reaches its destination and has been unloaded, this container 10 may be thoroughly cleaned. First, the lid 106 is disassembled from the base 12 by disconnecting the lid snaps 118 from the base notches 120 allowing access to the interior 84 for removal of any partitions 86, 102. Next, the filter unit retainers 72 are removed from their respective support members 38 allowing disposal of the pieces of filter cloth 70. The flexibility of the open structure 74 of the retainer 72 facilitates release of the retainer edge segment 76 from the support member raised edge holding tabs 66 made pliable by the aligning slots 68. Lastly, the filter unit support members 38 are moved for their respective base and lid openings 28. In this case, support member removal is facilitated by the shortened height of the raised edge inner rib 54. As now disassembled, all surfaces of the individual components of the containers 10 may be sterilized insuring that there is no cross-contamination between animals in the previous shipment and those in the next. As noted earlier, where the filter units 34 are made as an integral construction, the filter units 34 are simply removed and discarded.

While an embodiment, uses, and advantages of this invention have been shown and discussed, it should be understood that this invention is limited only by th scope of the claims. Those skilled in the art will appreciate that various modifications and changes may be made without departing from the scope and spirit of the invention, and these modifications and changes may result in further uses and advantages.

What I claim is:

1. A container particularly adapted for shipping medically useful rodents, said container comprising:

a base defined by a bottom wall connecting with outwardly sloped side and end walls, an inverted L-like shaped peripheral edge flange connecting with upper ends of said side and end walls, and a set of spaced openings in said walls, a lid having a downward facing edge channel prepared to fit tightly over said base edge flange and be secured thereto by spaced apart inward projecting snaps on an outer flange of said channel to form an airtight fit, said lid having outer sections formed with respective raised portions, and a set of openings in said raised portions, and filter units disposable in said base and lid openings, said filter unit including a support member defined by a perforated backing plate surrounded by a flexible, raised edge having an outward facing channel to fit over an edge of said opening and form an airtight fit therewith, and a retainer having a perimeter edge segment surrounding an open structure with said retainer edge segment prepared to be secured to said support member raised edge and hold a piece of filter cloth to cover said backing plate, wherein after completion of a shipment of said rodents, said lid may be detached from said base, said filter units detached from said base and lid, and said base and lid sterilized to prevent cross-contamination between rodents in that shipment and rodents in a next shipment.

2. A container as defined by claim 1 and further characterized by, said outer sections of said lid hinged to a middle cross piece having edge channels with snaps to hold said cross piece to said base edge flange as said outer sections open and close.

3. A container as defined by claim 1 and further characterized by said container including, a lateral partition having outer edges releasably fitting between pairs of ribs formed on respective inner sides of said base sidewall and said bottom wall to divide an interior space of said base into large compartments, said lateral partition including a central feeding bin having sidewalls with bottom slots accessible from each said compartment.

4. A container as defined by claim 3 and further characterized by said container including,
   a longitudinal partition to divide said large compartment into small compartments, said longitudinal partition having one end releasably fitting between a pair of ribs on said inner side of said base bottom and end wall and an opposite end releasably fitting between a pair of ribs on said lateral partition.

5. A container as defined by claim 1 and further characterized by,
   said lid outer section raised portions having spaced apart, upwardly sloped end walls connected by a top horizontal segment formed with windows.

6. A container as defined by claim 5 and further characterized by,
   said lid top horizontal having spaced apart guide posts.

7. A container as defined by claim 1 and further characterized by,
   said lid edge channel including a rib spaced inward from said outer flange and a pair of pointed sealing beads on a top wall of said channel.

8. A container as defined by claim 1 and further characterized by,
   said filter unit support member raised edge channel defined by an outer flange spaced from an inner rib and a pointed sealing bead formed on said outer flange, and a set of spaced apart tabs on an inside face of said raised edge positioned to align with slots in said backing plate,
   wherein said perimeter edge segment of said retainer may be releasably inserted under said raised edge tabs.

9. A container for shipping medically useful rodents, said container comprising:
   a base having a boxlike shape defined by connecting side and end walls, a peripheral edge flange joining to upper ends of said walls with said edge flange having a horizontal leg connecting with a vertical leg having a set of spaced apart notches, and a set of openings formed in said walls,
   a lid formed with a set of openings and an edge channel defined by an inner rib and an outer flange formed with offset snaps spaced to align with said base edge flange notches and a pair of sealing beads on a top wall of said channel, said channel fitting snugly over said base edge flange and said sealing beads being in continuous contact with said base edge flange horizontal leg so that said lid edge channel forms an airtight fit with said base edge flange, and
   filter units disposed in said base and lid openings, said units defined in part by a support member having a raised edge with an outward facing channel having an inner rib spaced from an outer flange and a sealing bead on said outer flange so that said filter unit raised edges form air tight fits with edges of said base and lid openings,
   wherein movement of air into and out of said container is restricted to that through said filter units.

10. A container as defined by claim 9 and further characterized by,
    said sealing beads have pointed ends.

11. A rodent shipping container comprising:
   a base, said base having a bottom wall connecting with outwardly sloped sides and end walls, a peripheral edge flange joining upper ends of said side and end walls, a set of spaced apart notches formed in a vertical leg of said edge flange, and a set of openings in said side and end walls,
   a lateral partition, said partition located in an interior space of said base to divide said space into large compartments, said partition having spaced apart perforated end portions connection by a feeding bin with outer edges of said partition end portions releasably held by ribs on an inner side of each said base sidewall and said bottom wall,
   a lid, said lid having a middle cross piece having respective ends formed edge channels, said channel having an inner rib and an outer flange with an offset snap on a bottom end of said outer flange selectively secured in said aligning notches in said base edge flange to hold said cross piece to said base and form a sealed fit therewith, spaced apart outer sections integrally hinged to said cross piece with each outer section having a raised portion defined in part by top horizontal segment connecting spaced apart, sloped end walls and an edge channel to mate with said base edge flange, said outer section edge channels each having an inner rib and an outer flange with a set of spaced offset snaps on a bottom end of an outer flange to engage said respective aligning notches in said base edge flange to hold said lid outer sections to said base and form sealed fits therewith, a set of openings in said each said raised portion end walls, and ribs on an inner side of said lid cross piece to engage upper ends of sidewalls of said lateral partition feeding bin, and
   a filter unit releasably disposed one each in said base and lid openings, said filter unit including a support member having a raised edge fitting about a perforated backing plate with said raised edge having an outward facing channel defined by an outer flange and an inner rib fitting about an edge of said opening and forming sealed fit therewith and sets of spaced apart holding tabs on an inside of said raised edge positioned to align with slots in said backing plate, and a retainer having a perimeter edge segment fitting about an open structure, said retainer prepared to hold a piece of filter cloth on said support member backing plate with said retainer perimeter edge segment fitting under said support member raised edge holding tabs,
   wherein after completion of a shipment of said rodents, said lid may be disassembled from said base, said lateral partition removed from said base, said filter units removed from said lid and base and then disassembled to allow a thorough cleaning of said lid, base and filter unit components to inhibit cross-contamination of rodents in a next shipment.

* * * * *